Aug. 23, 1932.   I. SERRURIER   1,873,342
APPARATUS FOR EXAMINING AND SELECTING MOTION PICTURE FILMS
Filed April 3, 1929   4 Sheets-Sheet 1
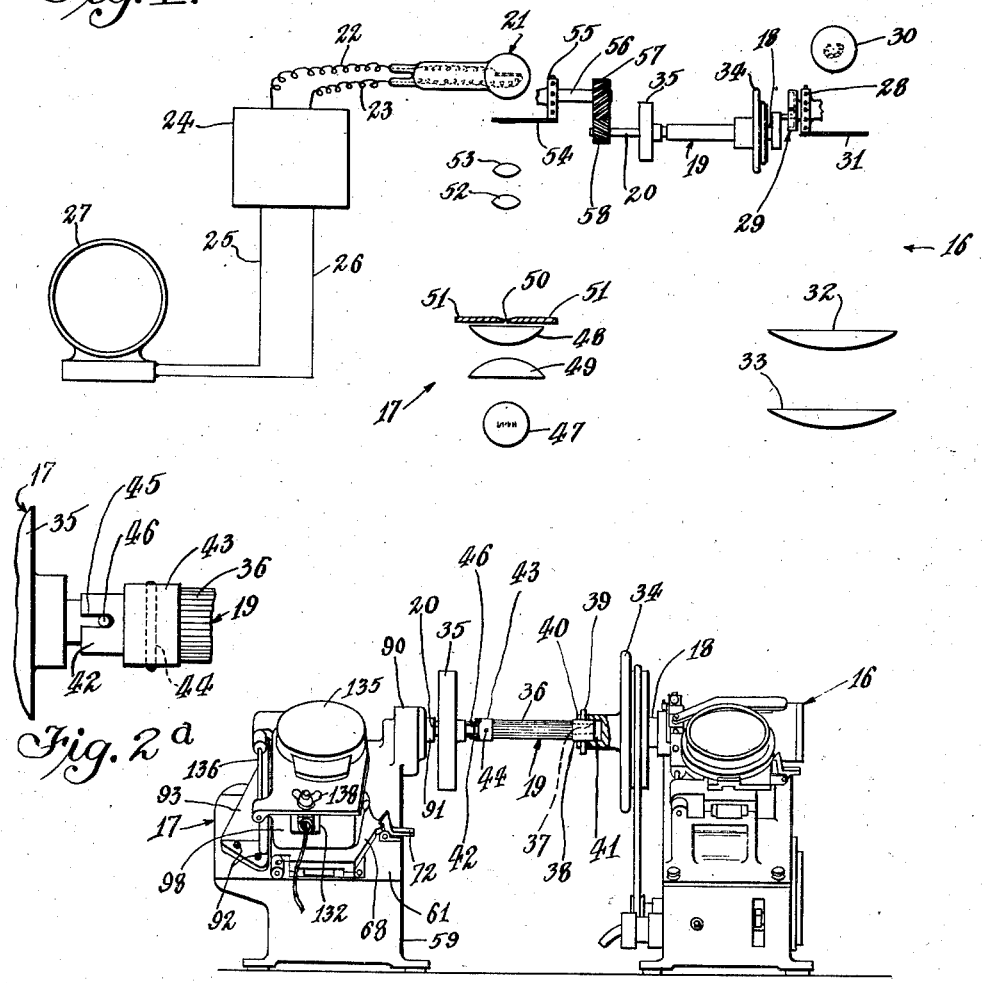
Fig. 1.
Fig. 2a.
Fig. 2.
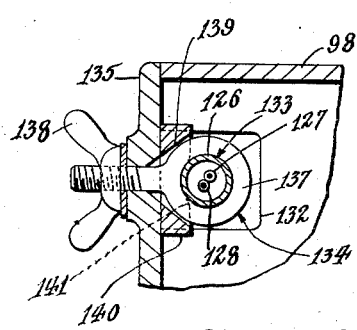
Fig. 12.
Inventor
Iwan Serrurier
By Lyon+Lyon
Attorneys Aug. 23, 1932.  I. SERRURIER  1,873,342
APPARATUS FOR EXAMINING AND SELECTING MOTION PICTURE FILMS
Filed April 3, 1929  4 Sheets-Sheet 2
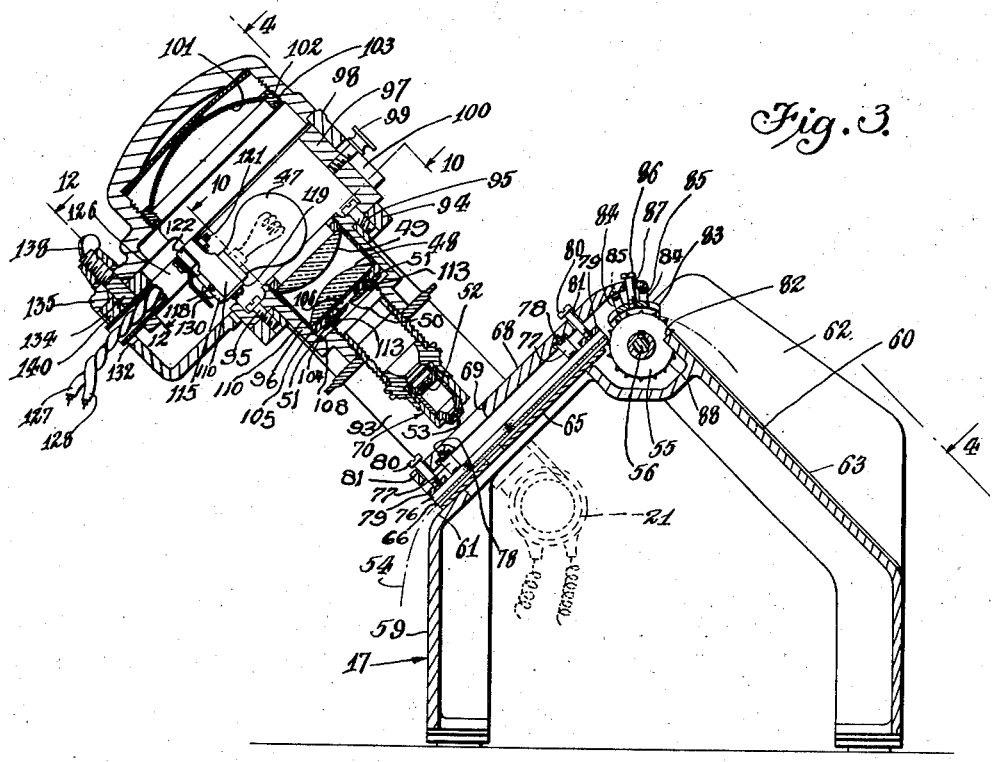
Fig. 3.
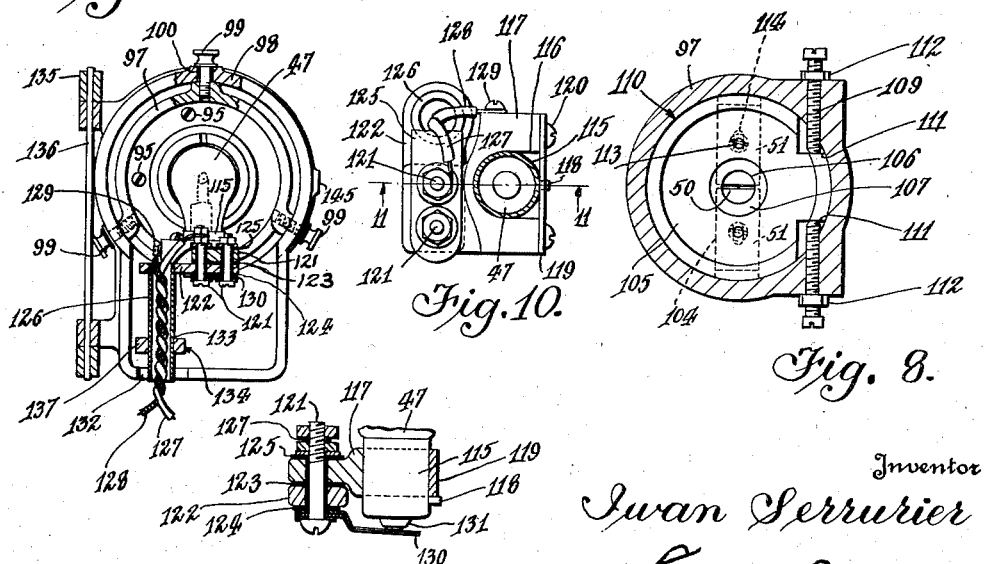
Fig. 9.  Fig. 10.  Fig. 8.
Fig. 11.
Inventor
Iwan Serrurier
By Lyon & Lyon
Attorneys Aug. 23, 1932.   I. SERRURIER   1,873,342
APPARATUS FOR EXAMINING AND SELECTING MOTION PICTURE FILMS
Filed April 3, 1929   4 Sheets-Sheet 3
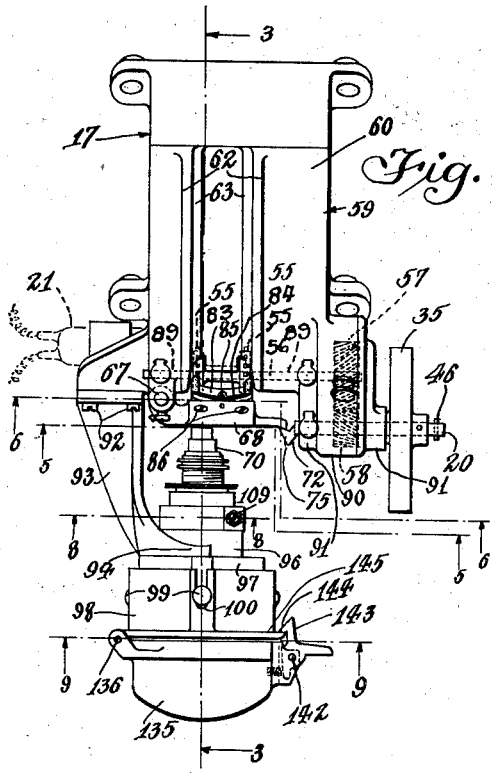
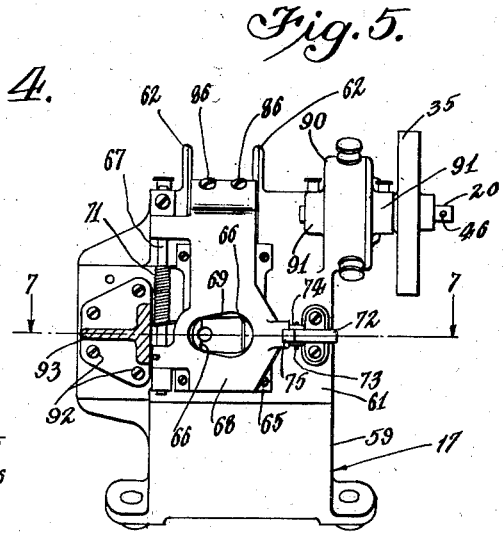
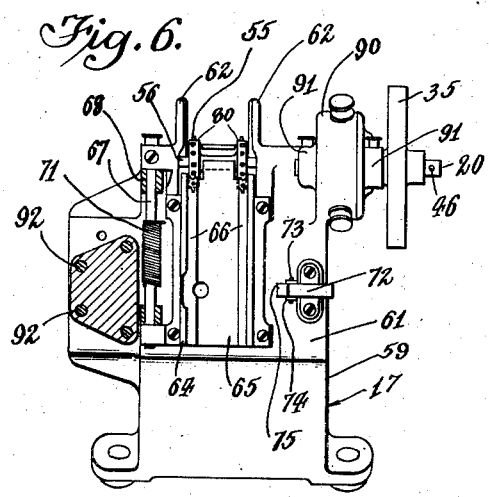
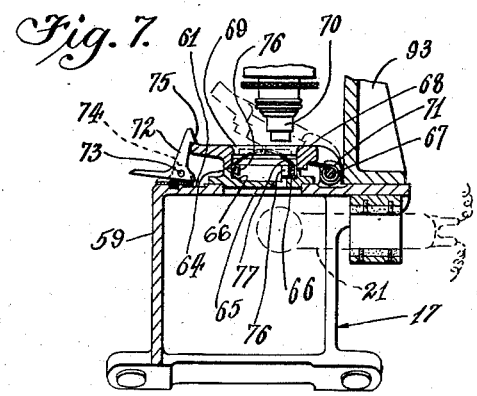
Inventor
Iwan Serrurier
By Lyon & Lyon
Attorneys

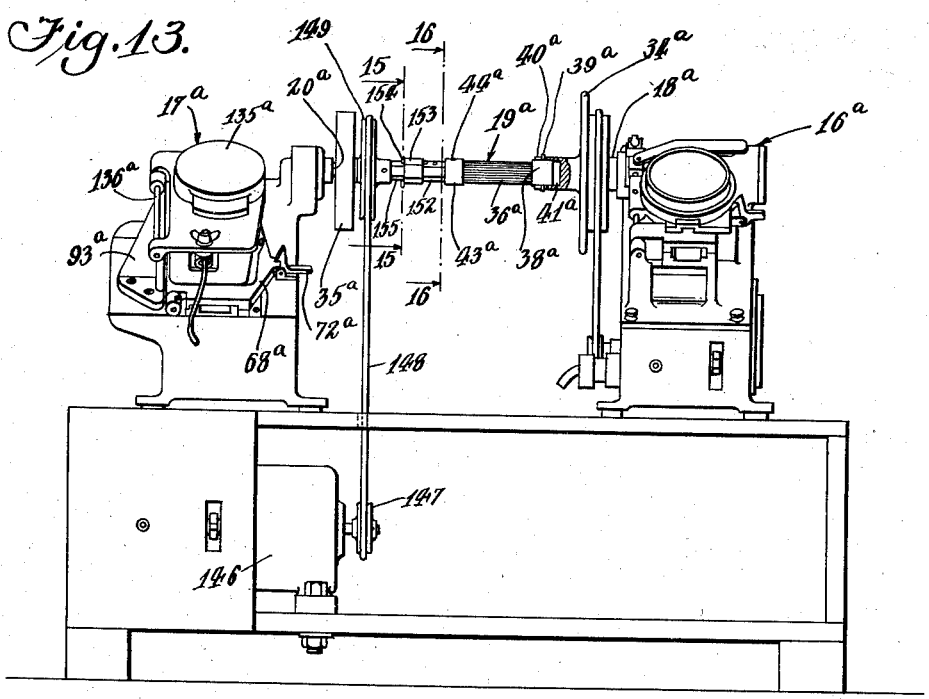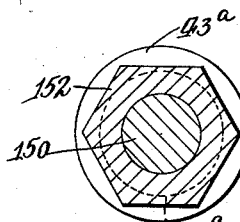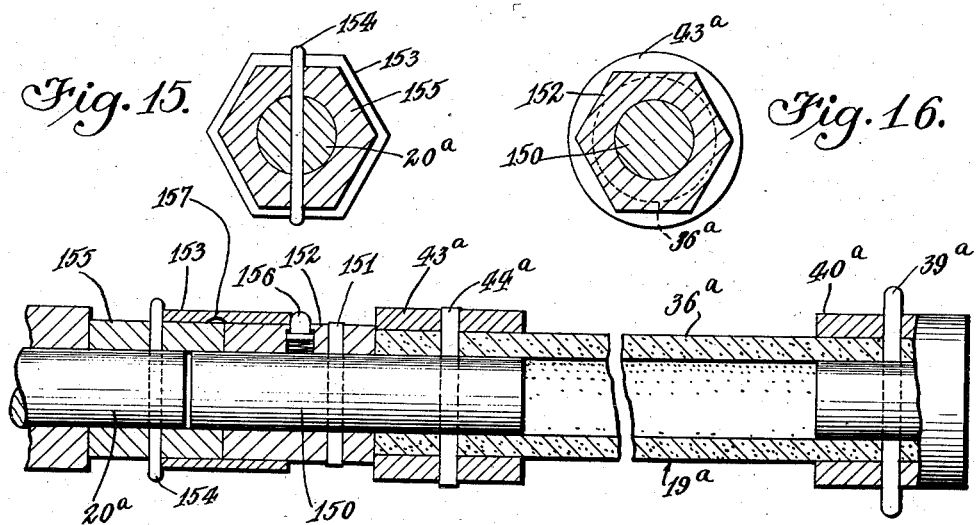

Patented Aug. 23, 1932

1,873,342

UNITED STATES PATENT OFFICE

IWAN SERRURIER, OF HOLLYWOOD, CALIFORNIA

APPARATUS FOR EXAMINING AND SELECTING MOTION PICTURE FILMS

Application filed April 3, 1929. Serial No. 352,167.

This invention relates to apparatus for examining and selecting motion picture films and it may be used for simultaneously or independently reproducing the visual record and sound record of a single film or of separate films. An apparatus of this character is useful during the operation of "cutting" the films, to facilitate properly matching the pictures with the sound record. As is well known in this art, it has been customary to cut out portions of a motion picture film before printing positives therefrom for distribution. Since the advent of "talking" pictures, it has been difficult to properly accomplish this cutting and, at the same time, eliminate or change the relative positions of the pictures and the sound record that should rightly accompany the pictures, that is to say, be reproduced simultaneously with the projection of the pictures on the screen. Accordingly, it is an important object of the present invention to facilitate the cutting of talking picture films.

In the making of motion pictures with sound recorded on the film, it is convenient to use two different films, one for receiving the pictures and another for receiving the sound record, even though the separate records be later combined on one film for distribution.

When using this invention, positives are first printed from the picture and sound record negatives as originally made, and these positives are reproduced in the apparatus. If desired, the picture and sound films may be run simultaneously and, when any portion of the picture is to be cut, the operation of the apparatus is stopped and either or both films cut, as desired. According to circumstances, it may be only necessary to cut the picture film, in some instances, while, in other instances, it may be necessary to cut the sound track.

The apparatus is nicely adapted for use in selecting stock sounds or music to go with a picture, even though such stock sounds or music were originally not made for that particular picture.

The picture reproducing or viewing unit, as is customary, has a Geneva movement or a similar mechanism for producing intermittent motion of the picture film. The sound track reproducing unit operates to constantly feed the sound track film, and it is an object of the present invention to couple the two units together by a construction that will synchronize the two films, when desired, and avoid the transmission of vibrations from the picture reproducing unit to the sound reproducing unit.

Another object is to provide a construction that will enable the sound reproducing unit to be constructed as a separate unit and coupled to the picture viewing unit without the necessity of rigidly mounting both units on a single base with the shafts accurately alined.

Another object is to facilitate the removal and replacement of the sound track film.

Another object is to make provision for universal adjustment of the lamp in the sound reproducing unit so that the light may be properly concentrated on the slot.

Other objects and advantages will appear in the subjoined detailed description.

The accompanying drawings illustrate the invention.

Figure 1 is a diagrammatic view of an apparatus for simultaneously reproducing the visual and sound records of separate films, the same being constructed in accordance with the provisions of this invention.

Figure 2 is a front elevation of the two units coupled together, the amplifier and loud speaker omitted.

Figure 2a is a fragmental enlarged detail of a portion of the connections between the two units.

Figure 3 is a vertical section of the sound reproducing unit, the plane of section being indicated by the line 3—3, Figure 4.

Figure 4 is a top view of the sound reproducing unit, the plane from which the view is taken being indicated by the line 4—4, Figure 3. Figure 4 is on a smaller scale than Figure 3.

Figure 5 is an elevation, partly in section, from the irregular line indicated by 5—5, Figure 4.

Figure 6 is an elevation, partly in section, from the line indicated by 6—6, Figure 4.

Figure 7 is a horizontal section on the line indicated by 7—7, Figure 5.

Figure 8 is an enlarged vertical section on the line indicated by 8—8, Figure 4.

Figure 9 is an enlarged vertical section on the line indicated by 9—9, Figure 4.

Figure 10 is a view, partly in section, from the line indicated by 10—10, Figure 3.

Figure 11 is an enlarged fragmental vertical section on the line indicated by 11—11, Figure 10.

Figure 12 is an enlarged fragmentary view, partly in section, from the line indicated by 12—12, Figure 3.

Figure 13 is a front elevation, similar to Fig. 2, showing a modified form of apparatus constructed in accordance with the provisions of this invention. The two units are shown coupled together, the drive shaft of sound track reproducing unit being belted to the driving motor.

Figure 14 is an enlarged broken mid-section of the shaft coupling shown in Fig. 13.

Figures 15 and 16 are enlarged vertical sections on the lines indicated by 15—15, 16—16, respectively, in Fig. 13.

Referring to Figs. 1 to 12 of the drawings, there are provided a film viewing or reproducing unit 16 and a sound track reproducing unit 17, the shaft 18 of the unit 16 being directly coupled, as indicated at 19, to the shaft 20 of the unit 17. The unit 17 includes a photo electric cell 21 of well known construction connected by wires 22, 23 to an amplifier 24. The amplifier is not illustrated and described in detail herein since its construction and operation is well known in the art relating to radio transmission of sounds. The amplifier 24 is connected by wires 25, 26 to a receiver 27 which, in this instance, is shown in the form of a loud speaker, though it is to be understood that ear phones may be employed, if desired.

A detailed description of the film viewing unit 16 is unnecesary as units of this character are well understood in the art relating thereto. In this particular instance, the unit 16 corresponds in construction to that disclosed in my co-pending application filed Oct. 29, 1924, Serial Number 746,511. It suffices to indicate in Figure 1 the main features of the unit 16 for a clear comprehension of the invention. The unit 16 comprises a film actuating sprocket 28, and an intermittent motion mechanism 29 for giving intermittent movement to the sprocket 28 and which receives its motion from the shaft 18. A lamp, indicated at 30, illuminates the picture film 31, a fragment of which is shown engaged with the sprocket 28. The viewing lens system of the unit 16 comprises the lenses 32, 33. The fly-wheel of the unit 16 is indicated at 34 and the fly-wheel of the unit 17 is indicated at 35.

The coupling 19, for connecting the shafts 18, 20, comprises a rubber tube 36 provided in one end with a metal plug 37 and surrounded at that end by a sleeve 38, a pin 39 passing through the sleeve and plug and projecting beyond the sleeve to form shoulders which engage in slots 40 that extend lengthwise of the shaft 18. The sleeve 38 fits in a bore 41 in the shaft 18. In the other end of the tube 36 is a bushing 42 and around said end is a sleeve 43. The sleeve and bushing are secured in place by a pin 44. The bushing 42 projects outside of the tube 36 and is provided with longitudinally extending slots 45 which releasably engage shoulders 46 projecting from the periphery of the shaft 20. Thus, it will be seen, that the coupling 19 may be readily detached from both units 16, 17.

Important features of the unit 17, as shown diagrammatically in Figure 1, are a lamp 47, and a condensing lens system, comprising lenses 48, 49 for condensing the light from the lamp 47 through the slot 50 provided by the spaced plates 51. There is also a microscopic objective lens system, comprising lenses 52, 53, which receives the light from the slot 50 and projects it through the sound track recorded on the film 54, the light rays that pass through said film reaching the photo electric cell 21. The sprocket for actuating the film 54 is indicated at 55 and is mounted on a shaft 56. Gears 57, 58 connect the shaft 56 to the shaft 20.

There is provided a hollow support 59 within which the photo electric cell 21 may be mounted in any suitable manner. The support 59 is provided with upper faces 60, 61 that slant upwardly toward each other, there projecting upwardly from the face 60 spaced guide flanges 62 between which the film is adapted to move, the marginal portions of said film resting on elevated seats 63 so as to protect the more central portions of the film against contact with the face 60.

Secured in any suitable manner to the face 61, in alignment with the flanges 62, are film guide flanges 64 connected by a plate 65. The upper face of the plate 65, adjacent to the inner faces of the flanges 64, is provided with elevated film seats 66 to protect the more central portions of the film.

Hinged at 67 to the face 61 is a gate 68 provided with a transversely extending slot 69 which is of sufficient size to accommodate the inner projecting portion of the barrel 70 in which the lenses 52, 53 are mounted, when the gate is in open position. The gate is urged into open position by a coil spring 71 on the pintle of the hinge 67 and the gate is held closed, against the opening pressure of said spring, by a latch 72 which is pivoted at 73 to the ears 74 that project upwardly from the face 61. The latch 72 has a shoulder 75 that hooks over the upper face of one margin of the gate.

The gate 68 is provided with pressure shoes or strips 76 which are yieldingly held toward the seats 66 by bow springs 77 that have their opposite ends resting against the pressure strips and their central portions fixed at 78 to the under face of the gate. The pressure strips are connected, at their opposite ends, by cross members 79 from which project screws 80 which pass through holes 81 in the gate, the heads of the screws limiting movement of the pressure strips away from the gate when said gate is open.

The upper ends of the seats 63 are spaced from the upper ends of the seats 66, the spaces being indicated at 82. In the spaces 82, and thus in alignment with the seats 63, 66, are the film actuating sprockets 55. Immediately over the sprockets 55 is a pressure shoe 83 which is yieldingly held toward the sprockets 55 by bow springs 84, the ends of said springs 84 resting against the shoe 83 and the central portion of said springs being fixed at 85 to the under face of the gate 68. Projecting upwardly from the shoe 83 is a screw 86 which extends through a hole 87 in the gate, the head of the screw constituting a stop to limit movement of the shoe 83 away from the gate, when said gate is open. The end portions of the under face of the shoe 83 are curved to conform to the untoothed or smooth peripheral portions 88 of the sprockets 55 so that said end portions of the shoe rest upon the marginal portions of the film and thus bend said film around the sprockets. The sprocket shaft 56 turns in bearings 89 in the support 59 and said support forms a gear case 90 in which the gears 57, 58 are housed, the shaft 20 turning in bearings 91 in said gear case.

The various lenses are supported as follows: secured by screws 92, or their equivalents, to the face 61 is an angle bracket 93, the outer face of the outer flange 94 of which lies in a plane parallel to the plane of the seats 66. Secured by screws 95 to the outer face of the flange 94 is a lens holder 96 in which are mounted the lenses 48, 49. The lens holder has an upwardly projecting member 97 on which telescopes a lamp housing 98, thumb screws 99 projecting from the member 97 through slots 100 in the lamp housing 98. The slots 100 open to the lower edge of the lamp housing so that said lamp housing can be slipped off of the member 97 by simply loosening the screws 99 and without removing said screws. Inside of the upper end of the lamp housing is a mirror 101 held in place by a ring 102 which is screwed into a threaded portion 103 in the lamp housing.

Into the lower end of the lens holder 96 is screwed or otherwise secured the lens barrel 70. The slot 50 may be adjusted as to width by relative shifting of the plates 51, and said slot may be adjusted angularly and both of these adjustments are afforded by the following described construction. The plates 51 are slidably mounted in a groove 104 extending transversely in a disc 105 which is provided centrally with an orifice 106, the projecting longitudinal axes of the plates 51 cutting through the axis of the orifice 106. In this instance, the wall of the orifice 106 is beveled as indicated at 107. The disc 105 is rotatably mounted within the holder 96, said disc seating upon a shoulder 108 in said holder. A means is provided to turn the disc into different angular positions and to hold the disc in the positions to which it is adjusted and, in this instance, this means comprises a pair of axially aligned screws 109 screwed into the holder 96 and projecting into the bore 110 in which the disc 105 is positioned. The inner ends of the screws 109 engage oppositely disposed shoulders 111 of the disc 105. By unscrewing either of the screws 109 and screwing in the other one the disc 105 is caused to rotate on its axis, thus changing the angular position of the slot 50. Each of the screws 109 is provided with a jam nut 112. The plates 51 are adjustably held against sliding by screws 113 which are screwed into the disc 105, passing through slots 114 extending along the longitudinal axes of the plates 51.

The mounting for the lamp 47 is constructed as follows: the lamp 47 has its plug 115 extending into a recess 116 in a member 117, the pin 118 that projects from the plug 115 seating against the under edge of a strip 119 that is secured by screws 120 to one edge of the member 117. The depth of the recess 116 is slightly less than the diameter of the plug 115 so that the strip 119 will frictionally engage the plug 115, thus preventing turning of said plug 115 relative to the member 117.

Screws 121 pass through the member 117 and through an arm 122 so as to secure the member 117 to said arm. Insulation 123 electrically insulates the member 117 from the arm 122 and other insulation 124, 125 insulates the screws from the member 117 and said arm. The arm 122 projects from a tubular stem 126 through which pass the cables 127, 128 that supply the electric current to the lamp 47. One of the screws 121 constitutes a binding post to which the cable 127 is connected, and the other cable is grounded at 129 to the member 117. The screws 121 also pass through one end of a spring contact member 130 which is engaged by the plug contact 131 of the lamp. Thus the screws 121 hold the contact member 130 to the arm 122 and that screw 121 to which the cable 127 is connected is in electrical contact with the contact 130 so as to supply electric current to said contact 130.

The stem 126 projects through a slot 132 in the lamp housing 98 and, within the lamp housing, said stem passes through the circular orifice 133 of an eye-bolt 134 which passes through the cover 135 of the lamp housing, said cover being hinged at 136 to the main body of the lamp housing. The outer projecting end of the eye-bolt is provided with a wing nut 138. The ring portion 137 of the eye-bolt engages a slot 139 in a washer 140 and said washer is provided with concavities 141 on opposite sides of the slot 139, said concavities fitting the periphery of the stem 126. Thus when the wing nut 138 is loosened, the stem 126 may be adjusted endwise, may be turned on its axis and may be angularly adjusted relative to the lamp housing or, in other words, rotated about the axis of the eye-bolt. Thus the lamp mounting provides for universal adjustment of the lamp 47 so that its filament may be properly located with respect to the plane and axis of the lens system 48, 49.

The cover 135 of the lamp housing has pivoted to it at 142 a latch 143 which is provided with a shoulder 144 adapted to engage beneath a shoulder 145 of the body of the lamp housing.

The invention operates as follows: the gate 68 will be unlatched, thus permitting it to be opened by its actuating spring, and the film having on it the recorded sound track will be placed between the flanges 62, over the sprockets 55 and between the flanges 64, and the gate will then be closed. The film bearing the views will be placed in the film viewing machine in a manner well understood in the art relating thereto. The current will then be switched on by the operator who looks into the film viewing unit. When the operator notes views that he desires to eliminate from the picture film, he will switch off the current and cut from the picture film those parts not wanted. He will then open the gate 68, remove the sound record film and cut therefrom a length of film corresponding to that cut from the picture film or more or less, as desired. Then the operator switches on the current and proceeds as before to view the picture film and hear the sound record reproduced.

The intermittent motion of the film in the unit 16 produces vibrations which vibrations are absorbed by the flexible rubber hose 36 so that they will not be transmitted to the sound reproducing unit 17.

It is to be understood that two separate films may be simultaneously run through the film-viewing and sound-reproducing units, when the pictures and sound record are on the separate films, or that different portions of a single film containing the pictures and the sound record that should accompany said pictures may be run simultaneously by causing the same portion of the single film to run through the two units successively.

Now, referring more particularly to Figs. 13 to 16, inclusive, of the drawings, and describing the modification therein illustrated, the elements that functionally correspond to those hereinbefore described are indicated by the same reference characters, with the addition of the suffix "a". In this instance, the shaft 20a is directly operated by a motor, which is indicated at 146. The pulley 147 of this motor is connected by a belt 148 to a pulley 149 on the shaft 20a. The motor that operates the unit 16 cannot be seen because of the nature of the view, and a corresponding motor is provided for the unit 16a and is, also, unable to be seen for the same reason.

Thus, in this form of invention both units may be operated by either of the motors or, if desired, the motor supplied with the unit 16 may be omitted, in event that it is never desired to disconnect the unit 16a from the unit 17a and operate the unit 16a entirely independently.

The coupling 19a is constructed somewhat differently than the coupling 19 as the sleeve 43a is not fixed to the shaft 20a but, rather, is fixed to a shaft 150 that is alined with the shaft 20a. A clutch means is provided for connecting and disconnecting the shafts 20a, 150 and, in this instance, said clutch means is constructed as follows: Fixed by a pin 151 to the shaft 150 is a clutch member 152 that is angular in cross section and, mounted to slide on the clutch member 152 is a clutch sleeve 153 which fits the clutch member 152. Fixed to the shaft 20a by pin 154 is a clutch member 155 of the same cross sectional shape as the clutch member 152 and, thus, to engage the clutch, the sleeve 153 will be slid into position to engage both clutch members 152, 155; and to disengage the clutch, the clutch sleeve will be slid off of the clutch member 155 and rest only upon the clutch member 152. The pin 154 serves as a stop to limit motion of the clutch sleeve in one direction and a spring actuated detent 156 serves to yieldingly hold said sleeve against shifting in the opposite direction from the clutching position illustrated in Fig. 14. When the clutch sleeve is moved into position to disengage the clutch member 155, the detent 156 is adapted to engage a seat 157 in the inner face of the clutch sleeve.

In practice, either of the units 16a, 17a may be operated independently of the other, or they may be operated simultaneously by the motor 146. Furthermore, the unit 17a may be operated without operating the unit 16a, when it is desired to reproduce the sound track film independently of projecting the picture film. By thus disconnecting the unit 16a from the unit 17a, the operator receives the sound reproduction to greater advantage, since there is a certain amount of noise produced by operation of the unit 16a because of the intermittent film actuating mechanism.

I claim:

1. An apparatus of the character described comprising a film viewing unit provided with a shaft, a sound film reproducing unit provided with a shaft, and a rubber member connected at its opposite ends to said shafts.

2. An apparatus of the character described comprising a film viewing unit provided with an intermittent motion device for actuating the film, a shaft connected to said intermittent motion device, a sound film reproducing unit provided with a shaft, and a rubber member connected at its opposite ends to said shafts.

3. An apparatus of the character described comprising a film viewing unit including a shaft, a sound film reproducing unit including a shaft, a rubber member connected at one end to one of the shafts, and a clutch between the rubber member and the other shaft.

Signed at Los Angeles, Calif., this 27th day of March, 1929.

IWAN SERRURIER.